Dec. 8, 1931.  G. M. BELLANCA  1,835,370
AIRPLANE FUEL TANK
Filed Nov. 27, 1928
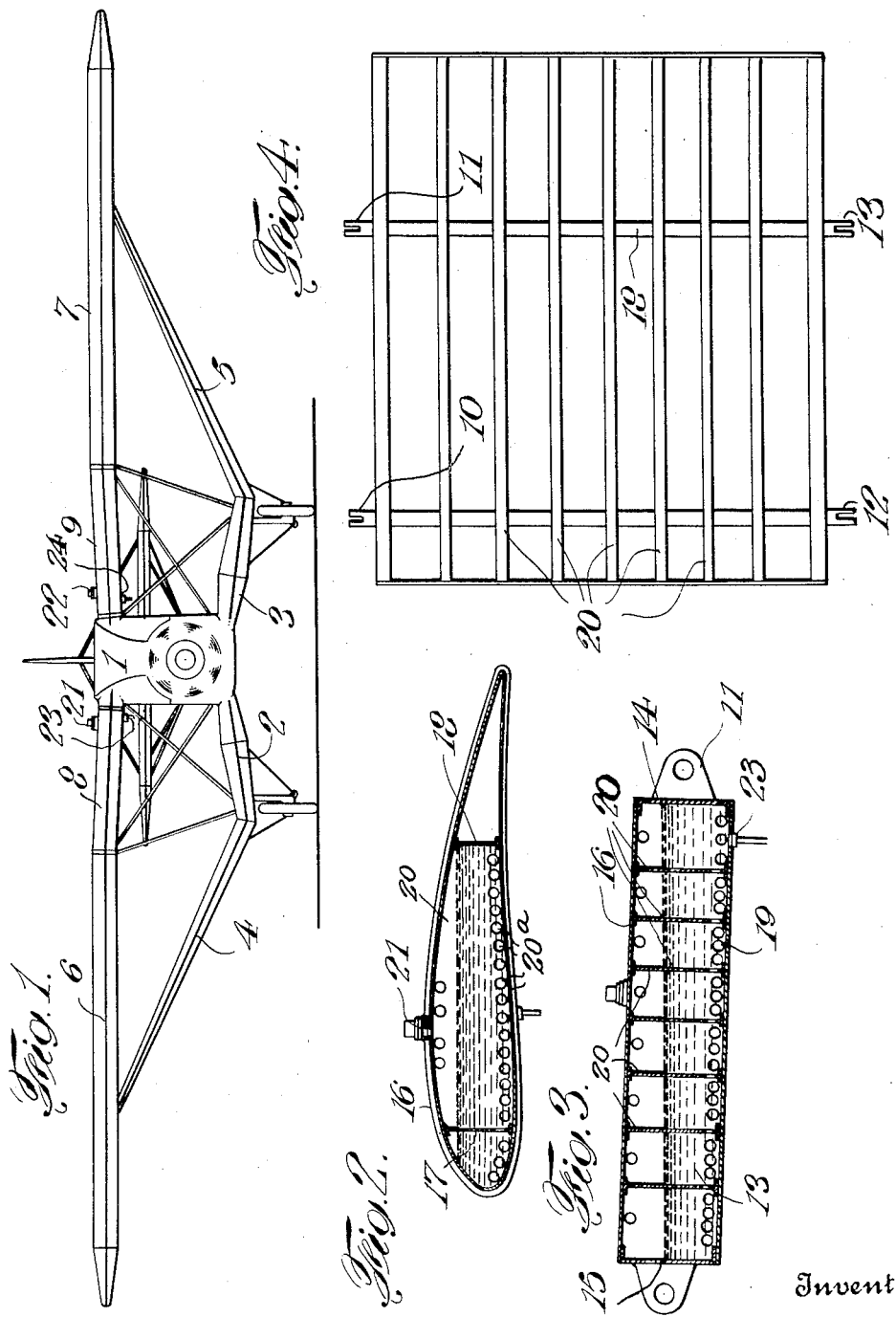
Inventor
G. M. Bellanca
By his Attorneys Patented Dec. 8, 1931

1,835,370

UNITED STATES PATENT OFFICE

GUISEPPE M. BELLANCA, OF WILMINGTON, DELAWARE

AIRPLANE FUEL TANK

Application filed November 27, 1928. Serial No. 322,127.

This invention relates to liquid fuel tanks for use in an airplane, which tanks consist in part of the conventional wing structure and will be understood from the following description read in conjunction with the drawings, in which Fig. 1 is a front view of an airplane comprising a gasoline tank according to my invention;

Fig. 2 is a vertical section transverse to the wing and parallel to the chord thereof through one of said gasoline tanks;

Fig. 3 is a vertical section longitudinal to the wing and transverse to the chord thereof through one of said gasoline tanks; and Fig. 4 is a horizontal mid-section through one of said tanks.

The airplane shown in Fig. 1 comprises a fuselage 1, lower stub wings 2 and 3, strut-wings 4 and 5 and upper wings 6 and 7. The upper wings comprise tank sections 8 and 9 adjacent the fuselage and symmetrically disposed with relation thereto. The sections 8 and 9 may be connected to the fuselage by pin fittings. One part of these pin fittings 10, 11, 12 and 13, respectively, appears in section in Fig. 4. The cooperating parts by which the tank sections are connected to the fuselage and conventional wing structure may consist of lugs adapted to project between the furcations of 10, 11, 12 and 13, respectively, and to be connected thereto by suitable pins extending through aligned apertures in said lugs and said parts 10, 11, 12 and 13. The sections 8 and 9 constitute the subject matter of my invention. These sections are substantially identical and may, therefore, be covered by a single description. They are wing sections intermediate any two ribs, such as 14 and 15, Fig. 3. These ribs are unperforated and therefore constitute bulkheads bounding the inside and outside extremities, respectively, of the said sections. The outer surface or skin 16 of the said sections is made of material impervious to liquids, for example, metal, preferably aluminum or duraluminum, and which combined with the said bulkheads operates to make substantially this entire section a fuel retaining tank. The outer surfaces of sections 8 and 9 simultaneously function to retain the liquid fuel therein and to contact with the slip stream to constitute air foils or lifting surfaces.

The forward and rearward beams 17 and 18 respectively, Figs. 2 and 4, within the section are preferably composed of metal. The rearward beam 18 is preferably unperforated to block off the rear portion of this section. The space within the section in back of the rearward beam is preferably left vacant to accommodate the controls for the plane. The forward beam carries perforations such as 19 so that it may function as a baffle. The parts of the forward and rearward beams within the sections 8 and 9 are preferably made of metal and appropriately designed to carry the stresses incidental to their primary functions as beams while simultaneously serving in the manner just described. The ribs 20 intermediate the ends 17 and 18 are preferably formed of continuous metal sheets with perforations 20a, slots or other means whereby they are adapted to simultaneously function both as ribs and baffle members, thereby permitting the flow of gasoline to the point of withdrawal as required while preventing excessive surges within the tank. It will, of course, be understood that the ribs 20 are designed to carry stresses incidental to their use as ribs while simultaneously functioning as baffles. The sections 8 and 9 constitute liquid fuel tanks for use in combination with the propulsive means of the airplane and are preferably located symmetrically with reference to the airplane structure, preferably adjacent the fuselage. The tanks may be filled by means of the nozzles 21 and 22, and the gasoline may be carried to the engine from outlets 23 and 24. Conventional dump valves may be provided if desired.

The outlets 23 and 24 are preferably located adjacent the fuselage and the tank sections 8 and 9 may have a slight dihedral to facilitate the flow of gasoline toward the outlets.

It will, of course, be understood that the foregoing specific description of an embodiment of my invention is by way of illustration and not of limitation. It is my intention that the invention be limited only by the appended claims, or their equivalents, in which I have endeavored to claim broadly all inherent novelty.

I claim:

1. An airplane comprising a fuselage, an airplane wing containing ribs extending therefrom, said airplane wing including an intermediate fuel tank section, the remainder of said wing being connected to said fuel tank section and extending outwardly therefrom to form a substantially continuous wing structure, the said fuel tank comprising a metallic upper airfoil surface, a metallic lower airfoil surface, a forward beam extending from said upper to said lower airfoil surface, a rearward beam extending from said upper to said lower airfoil surface, end closures bounding transversely the space defined by said upper and lower airfoil surfaces, the said airfoil surfaces and end closures forming a space for the retention of liquid fuel, at least the major part of the said airfoil surfaces functioning in addition as the skin of the said fuel tank section, ribs within said fuel tank section adapted to serve as stiffening members for said airfoil surface, the said forward and rearward beams in said tank section being adapted to carry stresses incidental to flight communicated to said fuselage from the remainder of said wing.

2. An airplane according to claim 1, in which the said fuel tank section contains perforate ribs intermediate the said end closures, the said ribs stiffening the said airfoil surfaces and forming baffles within the said fuel tank section.

3. An airplane comprising a fuselage, an airplane wing containing ribs extending therefrom, said airplane wing including an intermediate fuel tank section, the remainder of said wing being connected to said fuel tank section and extending outwardly therefrom to form a substantially continuous wing structure, the said fuel tank section comprising a metallic upper airfoil surface, a metallic lower airfoil surface, a forward beam extending from said upper to said lower airfoil surface, a rearward beam extending from said upper to said lower airfoil surface, end closures bounding transversely the space defined by said forward and rearward beams and said upper and lower airfoil surfaces, the said airfoil surfaces, beams and end closures forming a space for the retention of liquid fuel, the said airfoil surfaces constituting the skin of the said fuel tank section, and the said forward and rearward beams in the said tank section being adapted to carry stresses incidental to flight communicated to said fuselage from the remainder of said wing.

4. An airplane according to claim 3, in which the said fuel tank section contains perforate ribs intermediate the said end closures, the said ribs stiffening the said airfoil surfaces and forming baffles within the said fuel tank section.

5. An airplane comprising a fuselage, an airplane wing containing ribs extending therefrom, the said wing including an intermediate fuel tank section, the remainder of said wing being connected to said fuel tank section and extending outwardly therefrom to form a substantially continuous wing structure, the said fuel tank section comprising a metallic upper airfoil surface, a metallic lower airfoil surface, a forward beam extending from said upper to said lower airfoil surface, a rearward beam extending from said upper to said lower airfoil surface, end closures bounding transversely the space defined by said rearward beam and the said upper and lower airfoil surfaces, the entire space forward of the said rearward beam and intermediate the said airfoil surfaces and end closures forming a chamber for the retention of liquid fuel, the said airfoil surfaces constituting the skin of said chamber, and the said forward and rearward beams in said tank section being adapted to carry stresses incidental to flight communicated to said fuselage from the remainder of said wing.

6. An airplane according to claim 5, in which the said fuel tank section contains perforate ribs intermediate the said end closures, the said ribs stiffening the said airfoil surfaces and forming baffles within the said fuel tank section.

In testimony whereof, I have signed my name to this specification this 15 day of November, 1928.

GUISEPPE M. BELLANCA.